United States Patent
Wanner et al.

[19]

[11] Patent Number: 5,833,762
[45] Date of Patent: Nov. 10, 1998

[54] PROCESS FOR TREATING AN OBJECT, IN PARTICULAR AN AIRPLANE

[75] Inventors: Martin-Christoph Wanner, Stuttgart; Thomas Fred Herkommer, Gerlingen, both of Germany

[73] Assignee: Fraunhofer-Gesellschaft zur Foerderung der angewandten Forschung e.V., Munich, Germany

[21] Appl. No.: 591,606

[22] PCT Filed: Aug. 15, 1994

[86] PCT No.: PCT/EP94/02716

§ 371 Date: Apr. 30, 1996

§ 102(e) Date: Apr. 30, 1996

[87] PCT Pub. No.: WO95/05310

PCT Pub. Date: Feb. 23, 1995

[30] Foreign Application Priority Data

Aug. 13, 1993 [DE] Germany .......................... 43 27 268.1
Sep. 11, 1993 [DE] Germany .......................... 43 30 846.5

[51] Int. Cl.⁶ .................................................... B64F 5/00
[52] U.S. Cl. .......................... 134/18; 134/57 R; 134/123; 356/375
[58] Field of Search .................................. 134/18, 56 R, 134/57 R, 123; 356/375; 364/559

[56] References Cited

U.S. PATENT DOCUMENTS

| | | |
|---|---|---|
| 3,439,372 | 4/1969 | Collier . |
| 3,835,498 | 9/1974 | Arato . |
| 4,207,642 | 6/1980 | Arato ........................................ 15/179 |
| 4,378,755 | 4/1983 | Magnusson et al. . |
| 4,654,949 | 4/1987 | Pryor . |
| 4,712,970 | 12/1987 | Nakamura et al. . |
| 4,724,565 | 2/1988 | Higaki et al. . |
| 5,359,542 | 10/1994 | Pahmeier et al. ....................... 364/461 |

FOREIGN PATENT DOCUMENTS

| | | |
|---|---|---|
| 0 062 244 | 10/1982 | European Pat. Off. . |
| 0 262 097 | 3/1988 | European Pat. Off. . |
| 0 341 134 | 11/1989 | European Pat. Off. . |
| 0 404 684 | 12/1990 | European Pat. Off. . |
| 27 37 418 | 3/1979 | Germany . |
| 23 32 075 | 5/1984 | Germany . |
| 39 09 762 | 8/1990 | Germany . |
| 40 35 519 | 5/1991 | Germany . |
| 43 30 972 | 4/1994 | Germany . |
| 43 30 973 | 4/1994 | Germany . |
| 603 383 | 8/1978 | Switzerland . |

*Primary Examiner*—Jeffrey Snay
*Attorney, Agent, or Firm*—Flynn, Thiel, Boutell & Tanis, P.C.

[57] ABSTRACT

A process and arrangement are disclosed for cleaning the surface of airplanes (44). A large manipulator arranged on a truck (8) is moved towards the airplane (44) up to a predetermined position within its range of action and is parked in that position. A rotary brush-bearing head (18) is moved over the surface of the object by means of an articulated mast (13) arranged on the truck (10) and constituted of several extension arms (12, 12', 12", 12''', 14) that may swivel or slide with respect to each other at turning knuckles and/or prismatic joints and of a multiple joint (16) arranged at the last extension arm (14). In order to carry out a washing process in a reliable manner, without the risk of collisions even when the large manipulator is not accurately positioned in front of the airplane (44), the large manipulator is parked within a limited two-dimensional parking field (46) spaced apart from the airplane (44), while the joints (20 to 28) of the articulated mast (13) and/or the multiple joint (16) are controlled during the surface treatment according to a series of predetermined sets of joint co-ordinates associated to the actual position of the large manipulator within the parking field (46), and the brush-bearing head (18) is moved along a predetermined path of operation over the surface of the object.

30 Claims, 4 Drawing Sheets

PROCESS FOR TREATING AN OBJECT, IN PARTICULAR AN AIRPLANE

DESCRIPTION

The invention relates to a process and an arrangement for treating an object, in particular an airplane, according to the novel teachings herein.

A device for cleaning of airplanes or ships has become known from U.S. Pat. No. 3 835 498. This device has several rotatable washing brushes stationarily arranged on a crane by which the surface of the aircraft can be cleaned. However, this device requires a rotatable platform for the aircraft so that same can be rotated in front of the washing crane. The washing brushes are either stationary or are movable along defined directions. Thus it is necessary for the aircraft to be guided with respect to the washing device, and that the aircraft and the washing device must assume a specific relative position to one another. Positioning errors are practically unavoidable.

From the DE-A-4035519 it is already known to equip a large manipulator with a remote-controllable brush head. The known large manipulator has an articulated mast, which is composed of several arms pivotal with respect to one another at their ends, the base arm of the articulated mast is rotatably supported about a vertical axis on a bearing block arranged on a motor-driven undercarriage, and the last arm has a multiple joint, which can be equipped with the brush head. From this reference it is also known to provide the brush head with sensors, which enable an automatic control of the brush head relative to the surface to be treated in accordance with a sensor signal originating at the sensor during the cleaning process and can be outputted. Here, the large manipulator must also be positioned exactly with respect to the airplane.

Starting out from U.S. Pat. No. 3 835 498, the basic purpose of the invention is to further develop a process and an arrangement of the above-mentioned type in such a manner so that, in a particularly simple fashion, an almost complete compensation of positioning errors occurring during the setting up of the treating device in front of the object to be treated is possible.

This purpose is attained according to the inventive process and the inventive arrangement.

The steps of the invention enable, in a particularly advantageous manner, a correction of positioning errors of the treating device relative to the object to be treated. Through the inventively provided exchange of the operating-sequence control based on a predefined reference point with an operating-sequence control of a grid point of the parking field lying closest to the actual position of the treating device, it is achieved in a particularly simple fashion that the previously provided, complex and therefore expensive on-line monitoring of the treating unit can generally be eliminated in each case replacing an operating-sequence control based on an optimum reference point with an operating-sequence control, which was programmed in an advantageous manner off-line for a grid point of the parking field, which grid point is the closest to the actual position of the treating device, and was stored in a memory.

A further advantageous development of the invention provides that with at least one grid point of the parking field associated with the operating-sequence control, which grid point can be varied in depending on the relative distance between the actual position of the treating device and this grid point. With this inventive measure, it is also possible to reduce the number of the necessary grid points in the parking field since this on-line correction of the positioning error of the treating device makes it possible, in an advantageous manner, to treat the object with greater distances between the individual grid points, resulting in a wider meshed grid, whereby, in an advantageous manner, the number of operating-sequence controls to be set up for a parking field is being reduced. With the inventively provided on-line correction of the position error, it is furthermore possible to individually compensate for possible tolerances or deviations of the object to be treated from its standard dimensions specified when setting up the operating-sequence controls.

A further advantageous development of the invention provides that the operating-sequence control based on at least one grid point of the parking field is divided into a part depending only on the relative position of the grid point with respect to the predefined reference point, and into one depending essentially only on the relative distance between the actual position of the treating device and this grid point. With these inventive steps, it is achieved in an advantageous manner that the time elapsed between the reaching of the actual position of the treating device and the start of the treatment operation can be minimized since the part of the operating-sequence control controlling the treatment operation is set up off-line, and depends only on the grid point, therefore it can already be carried out, whereas the sequences of movement of the treatment operation depending on the relative distance are determined on-line.

According to a further advantageous development of the invention, it can therefore advantageously be provided that the at least one treating unit of the treating device is moved by the part of the operating-sequence control set up off-line into a position relative to the object to be treated, in which even in the most unfavorable relative distance between the grid point and the actual position of the treating device, a collision between the treating unit and object, which collision would result in damage or injury of the object to be treated, cannot occur.

In a preferred, hereinafter in more detail described exemplary embodiment, the treating device is a large manipulator arranged on an undercarriage, which large manipulator is moved into a specified position relative to the large object and is parked there, and in which a tool preferably designed as a rotating brush head is moved over the surface of the object by means of an articulated mast consisting of several arms pivotal or movable against one another on pivot and/or thrust joints, and, if necessary a multiple joint arranged on a last arm, and is arranged on the undercarriage.

The undercarriage is stationed according to the invention within the limited two-dimensional parking field spaced from the large object to be treated, and the joints of the articulated mast and/or of the multiple joint are controlled during the course of the surface treatment in accordance with a sequence of specified joint coordinate sets, which sequence is associated with the actual position of the undercarriage within the parking field, and which joint coordinate sets correspond with the operating-sequence control, and the tool is thereby moved along a specified operating path over the surface of the object.

A preferred embodiment of the invention provides thereby that the parking field is divided by a limited two-dimensional distance grid, that for each grid point of the distance grid there is specified a series of joint-coordinate sets defining the support points of the operating path of the tool stored as a joint-coordinate data file in a data bank of a data-processing system, and that the position-referenced joint coordinate sets, through interpolation from the joint-coordinate data files stored in the data bank, are calculated in accordance with the actual position of the undercarriage within the distance grid and are stored in the working data file, prior to starting the surface treatment by using the joint-coordinate sets selected from the working data file and, if necessary, additional movement-referenced parameters. The joint-coordinate sets selected from the working data file can follow in accordance with sensor signals preferably extracted at each support point of the operating path. For this purpose it is, for example, possible to measure the frictional or torsion resistance or the bearing pressure engaging the tool and to read same as a sensor signal for the guiding of the joint coordinates. Accordingly, it is also possible to measure other physical sizes, for example the distance of the tool from the object or a variable inclination of the large manipulator resulting from the deformations of the substructure, and to read same as a sensor signal. Also, in order to avoid during the guiding of the joint coordinates undesired collisions, it is advantageous to check the actual joint coordinate sets with respect to freedom from collisions through a comparison with joint coordinates stored with respect to adjacent grid points of the distance grid taking into consideration specified tolerance limits.

In a preferred arrangement for carrying out the process of the invention, in which the large manipulator has an articulated mast, which consists of several arms pivotal with respect to one another on pivot joints by means of hydraulic or motorized driving systems and rotatably supported with its base arm about a vertical axis on a pivot-bearing block of a motor-driven undercarriage, and has a tool preferably designed as a rotating brush head and arranged on the last arm of the articulated mast or on the free end of a multiple joint arranged on the last arm and having several thrust and/or pivot joints, it is suggested in order to attain the above-disclosed purpose that an opto-electronic distance camera, which can be aligned with the large object to be treated, is arranged on the undercarriage, and a calculator-supported evaluating electronics, which is loaded with the distance-image signals of the distance camera, is provided as an aid for moving and positioning, and for locating the large manipulator relative to the large object to be treated. The distance camera is thereby advantageously arranged rigidly or movably, in particular, pivotally about a vertical axis and/or inclinable about at least one horizontal axis on the large manipulator in the vicinity of the pivot-bearing block.

In order to create an association between the coordinates determined by the distance camera and the tool coordinates of the articulated mast, the evaluating electronics has, according to the invention, a program part for normalizing the joint coordinates of the articulated mast in accordance with the tool coordinates measured directed and the above electronic camera relative to a stationary, preferably cubic calibration member. Errors in the position of the large manipulator due to deformations of the arms, zero-position offset of the angle and path receiver and torsions in the substructure of the articulated arm and of the undercarriage are detected during this normalization.

The evaluating electronics has furthermore advantageously a storage arrangement for storing the reference-image data of marked sections of the large object viewed from a specified parking field and a software routine for comparing the distance-image data taken by the distance camera with the large manipulator positioned in front of the large object within reach of the articulated mast with the reference-image data with a coordinate-like association of the large manipulator position within the specified limited parking field. The parking field is advantageously divided by a two-dimensional distance grid, whereby with each grid point of the distance grid is associated a joint-coordinate data file or a movement program within a data bank, in which a series of joint-coordinate sets of the articulated mast along an operating path to be travelled by the tool on the surface of the object is stored.

In order to measure the joint coordinates a coordinate receiver preferably in the form of an angle or path receiver, is associated with each joint of the articulated mast and, if necessary, of the multiple joint at the output of which receiver the respective joint coordinate can be read.

The evaluating electronics has advantageously a program for calculating and storing a series of position-referenced joint-coordinate sets, which series is designated for the treatment operation, through interpolation from the stored joint-coordinate sets in accordance with the deviation of the actual position of the large manipulator from the next grid point within the specified distance grid.

To carry out the treatment operation, the evaluating electronics has a calculator-supported circuit part for controlling the drive systems of the articulated-mast joints in accordance with the deviation of the joint coordinates instantaneously read at the coordinate receivers from the associated values of the stored joint-coordinate sets. In order to be able to compensate for tolerance deviations, the tool has a sensor, which reacts to the distance from the surface to be treated, to its treatment resistance or to its depth of penetration into the surface to be treated, whereby correcting signals can be derived from the sensor signal in order to have the driving systems of the articulated-mast joints follow.

In order to, in addition, be able to compensate for deformations in the substructure of the large manipulator during the washing operation, at least one inclination indicator is associated with the pivot and/or inclination axes of the distance camera, from the output signals of which inclination indicator can be derived the correcting signals in order to have the driving systems follow.

The invention will be discussed in greater detail hereinafter in connection with one exemplary embodiment, which is schematically illustrated in the drawings, in which.

Figure 1:
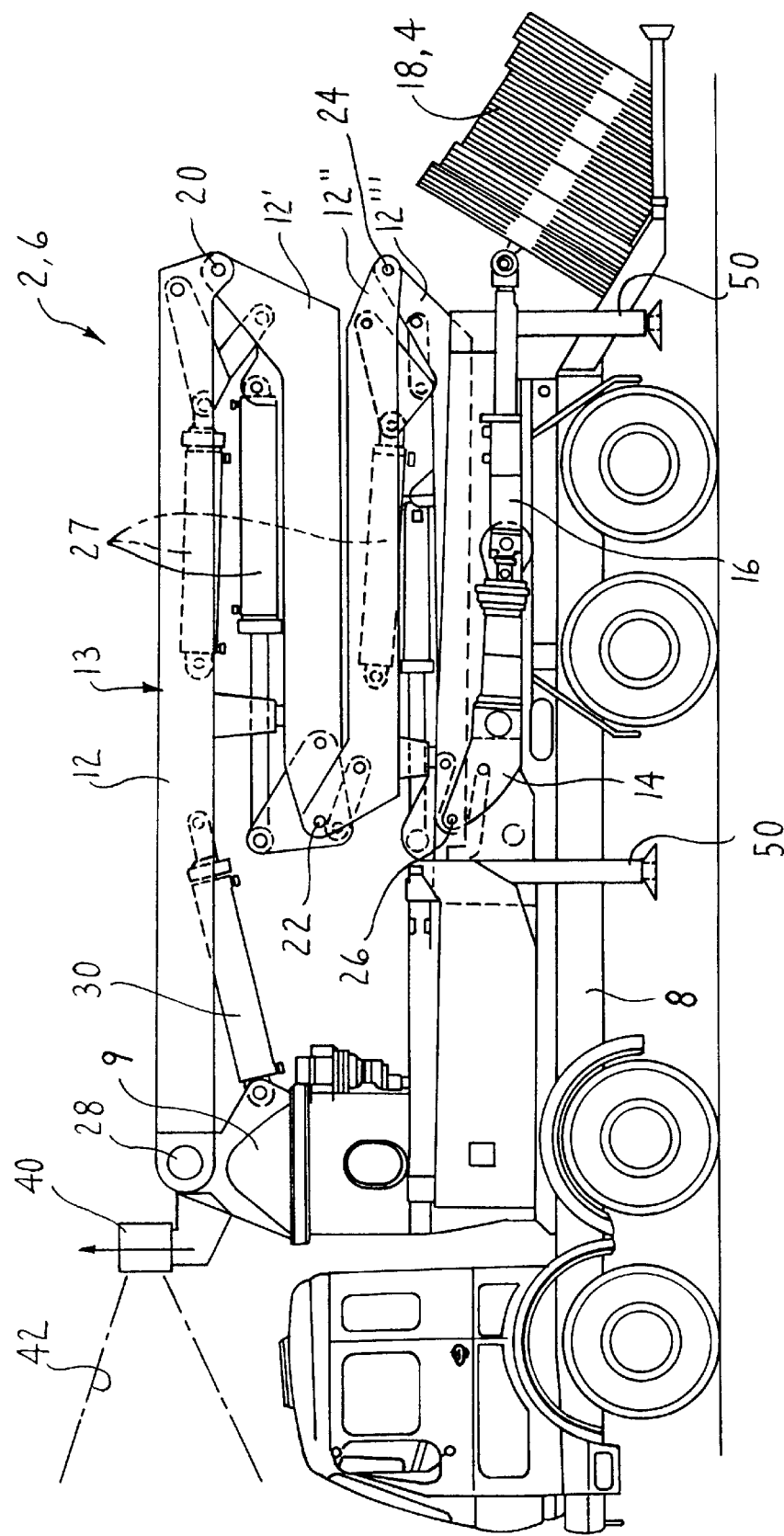
FIG. 1 is a side view of a movable large manipulator with a brush head for washing of airplanes in a collapsed position.
Figure 2A:
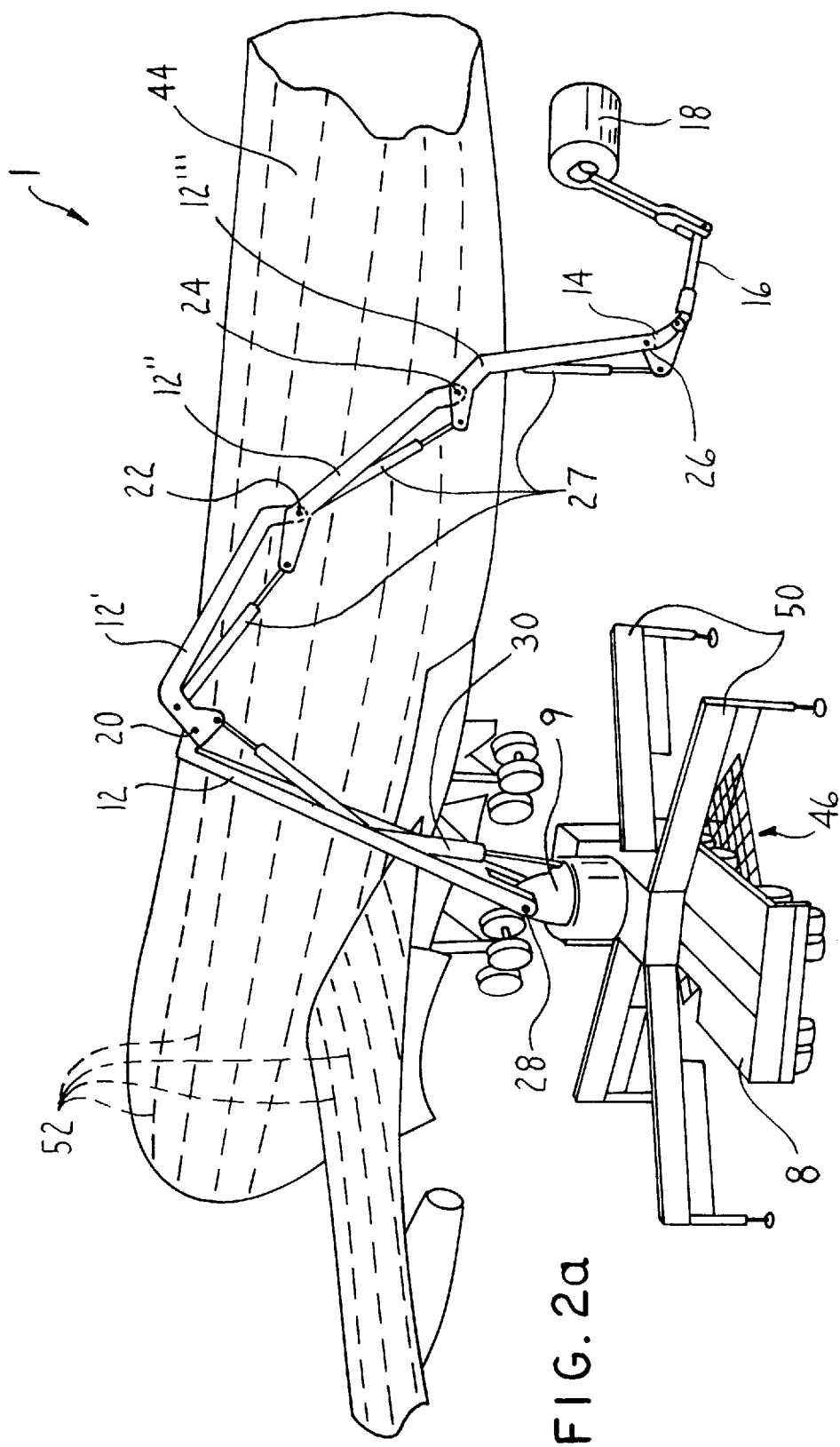
FIGS. 2a and 2b are two diagrammatic illustrations of the large manipulator in an operating position in front of an aircraft.
Figure 2B:
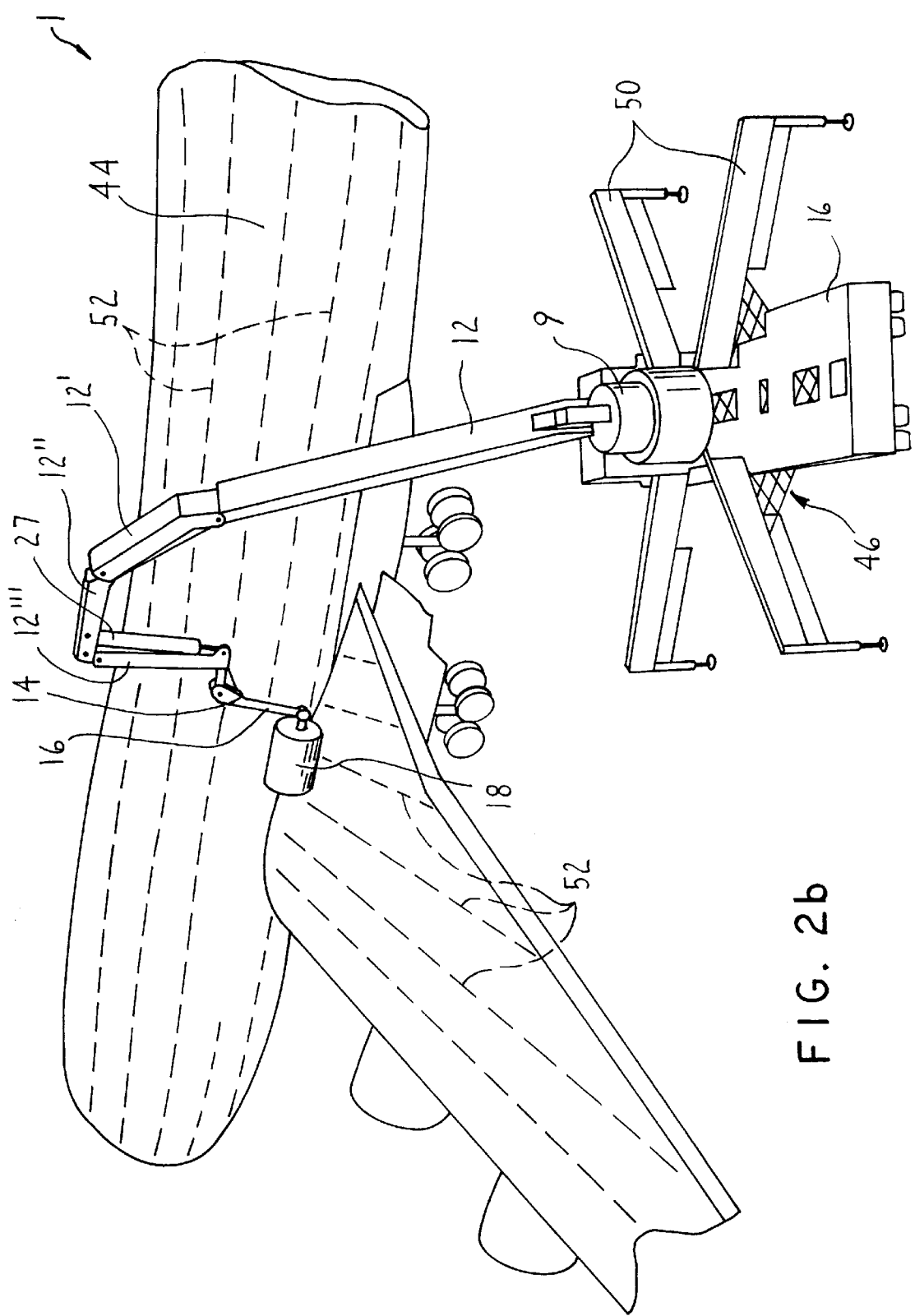

The mobile large manipulator illustrated in FIGS. 1 and 2 consists essentially of an articulated mast rotatably supported with its base arm 12 about a vertical axis on a pivot-bearing block 11 of a motor-driven undercarriage 10, a multiple joint 16 arranged on the last arm 14 of the articulated mast 13 and a brush head 18 releasably fastened to the free end of the multiple joint. The five arms 12, 12', 12", 12'" and 14 of the articulated mast 13 are connected with one another at their ends facing one another limited pivotally about horizontal axes at joints 20, 22, 24, 26. The pivoting is done by means of hydraulic cylinders 27, which are arranged between the arms at suitable points. The base arm 12 is supported pivotally on the pivot-bearing block 11 on a horizontal bearing 28 by means of a hydraulic drive 30. This arrangement makes it possible to cover with the brush head 18 any desired surface contours within the plane defined by the arms. With the help of the multiple joint 16, which can be adjusted by a motor, it is in additionally possible to move the brush head 18 in six degrees of freedom about several pivot and thrust axes relative to the last arm 14.

In the area of the pivot-bearing block 11 there is arranged an opto-electronic distance camera 40 in the form of a 3-D laser scanner, which detects a three-dimensional space within the viewing window 42 and digitalizes same with respect to the distance from an object of measurement 44. The distance camera 40 is arranged at a sufficient height above the undercarriage 10, in order to be able to measure significant areas of the object of measurement 44 from the viewing window 42. The distance camera 40 works with a laser beam which is moved with a specific cycle frequency through the opening angle of the viewing window 42. The evaluation of the distance signals, which result from a time-difference measurement, permits to recognize whether and at which distance a reflecting surface exists.

In order to adjust the distance measurement with the distance camera 40 and the deflection of the articulated mast 13 taking into consideration the various articulated-mast configurations to one another, a normalization of the manipulator with respect to the distance camera 40 is necessary. The zero positions of the manipulator axes 20, 22, 24, 26 and 28 are fixed during the normalization. These zero positions are determined through a closed kinematic chain, which, using a measuring cube, brings the measured results of the distance camera into relationship with the deflections of the articulated mast. The measuring cube is thereby oriented such that with the distance camera 40 a corner is located and this corner is used as a reference point for the positioning of the last arm 14 of the articulated mast 13. The angular positions of the joints during a plurality of articulated-mast configurations are hereby determined. From this result parameters for a set of equations based on which the coordinate transformation between the electronic camera 40 and the manipulator 13 can be determined. The zero positions of the individual joints are determined with these measurements, taking into consideration the deformations in the individual arms (12, 12', 12", 12'", 14), which right from the start cannot be exactly defined. The measurements are carried out at various distances in the measuring cube by the distance camera 40 in order to take into consideration the various constellations of the manipulator in consideration of the zero-position errors and of the deformations and of the orientation of the distance camera 40 relative to the manipulator system.

Figure 3:
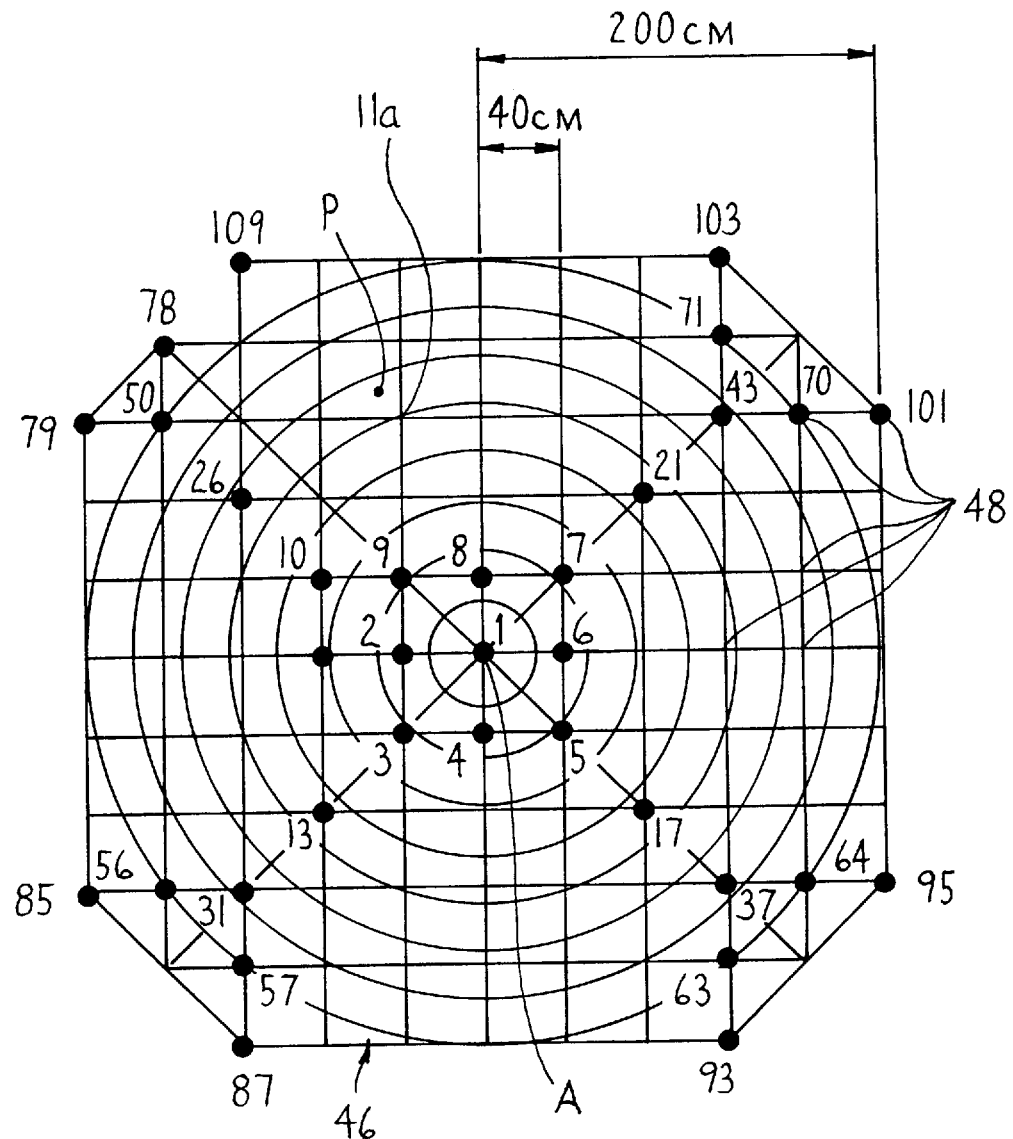
FIG. 3 is a top view of the grid-like parking field for the large manipulator according to FIGS. 2a and 2b.

In order to move the large manipulator 6 into a washing position in front of the aircraft 44, it must be put into a definite position during the course of the starting operation so that all surface areas to be covered during a washing program lie within the reach of the articulated mast 13 with the washing brush 18. In order to avoid unnecessary complications during the starting and positioning of the large manipulator, a, if necessary, virtual distance field 46 with a diameter of approximately 4 m is defined in each washing position, which in turn is divided into a rectangular grid with a grid spacing of 40 cm between the individual grid points 48 (FIG. 3). The grid spacing must thereby be no more exact than the exactness of the object to be measured. It is to be considered thereby that in the case of aircrafts, already due to tolerances between the individual models of a specific type and due to different loads and temperature conditions, differences in measurement of 50 cm and more can result.

In place of a circular parking field 46 fields are also conceivable, which have the shape of a polygon, in particular a rectangle or a square. The man skilled in the art can easily see that the geometric form of the parking field 46 can be freely chosen within wide limits depending on the configuration, and that the presently described circular design has only an exemplary character and by no means limits the described process to this. Furthermore, the equidistant grid illustrated in FIG. 3 does not limit the generality of the following discussions since these are valid in a corresponding manner for a non-equidistant grid and even for a chaotically distributed amount of grid points.

The image data produced through the distance camera 40 is evaluated in an evaluating circuit and an on-board calculator. A significant section of the airplane 44 is stored with reference to the viewing window 42 of the distance camera 40 as a reference image in a storage medium of the on-board calculator for each type of airplane to be worked and for each parking field 46 to be controlled. The distance camera continuously produces a distance image of the respective airplane section as an aid for moving into the parking field 46 and compares said image with the stored reference image. Direction and position data can be derived therefrom, which give the driver instructions for the direction of travel and the distance. Also, it is basically possible to convert the deviating signals resulting from this directly into driving and steering signals for the undercarriage. Goal of the aid for moving is to position the large manipulator on the parking field 46 within reach of the airplane 44 and to orient same with respect to the course angle. After reaching the parking field 46, the undercarriage 8 is supported on the ground by swinging out and by lowering the support legs 50 and is thus positioned relative to the airplane 44.

The large manipulator 6 can then be adjusted, namely its position within the grid field 46 and the orientation relative to the airplane 44 can be determined. This is also done with the help of the distance camera 40 through comparison with a stored reference sample. Since the distance camera is arranged at the articulated mast 13, it must be assured that its position is also considered when determining the course angle. After the adjustment, the inclination indicators are detected at the distance camera 40 and are set to zero. The relative angle is then considered in the movement program during a movement of the articulated mast 13 based on the inclination of the base.

Artificial set-up points 1 to 109 are then determined by the grid field 46 (FIG. 3), for each of which an offline (thus on an external calculator) created complete washing program is stored. A plurality of data sets, which define the angular positions of each joint, are stored as washing-program data (joint coordinate sets). Several such joint coordinate sets form a working path 52 along the airplane surface, which define the geometric location of the brush head during the washing operation. The washing program is checked on the external calculator such that no collision with the object, or possibly existing docks, or hall parts can occur. The distance between the individual coordinate support points is on the average 30 cm on the airplane surface. The exact position of the distance camera 40 with respect to the airplane 44 is now determined during the adjustment and thus the exact spot within the grid field 46. The joint coordinates are then recalculated from the next-lying grid point 48 by interpolation to the actual base. These data are stored in a data file in the operating store of the manipulator control as the actual washing program before the washing program is started through the manipulator control. Furthermore, the collision space of the individual joints is determined through the four adjacent points 48 within the grid field 46 and the permitted tolerances of, for example, ±50 cm. These four adjacent points, converted into joint coordinates, thus describe the space, in which the ends of the articulated-mast arms are permitted to move.

An alternative process provides that the program specified for the reference point A is replaced with a program, which has been filed for the grid point 11a being the closest to the actual position P. Thus this process uses the program being the closest to the actual position P, which has the advantage that an on-line adjustment of the program to the still existing deviation is not necessary, thus achieving a clear reduction of set-up period time.

The above-described modification of the process permits the correction of a positioning error during the set-up of the large manipulator 6 relative to the object 1 to be treated but for a residual position error, which is less or equal to half the distance between two diagonally opposing grid points 11 of the parking field 46. Such an exactness is sufficient for a plurality of uses. Of course it is understood here that this residual position error can be further reduced by using a more narrow-meshed grid net, meaning a grid with a reduced distance between two grid points 11.

When these preparations have been made, the actual washing operation can start. The articulated mast is for this purpose unfolded through an unfolding program. By successively recalling the joint coordinates from the operating data file desired values are obtained, which are reached by the washing brushes, whereby the actual and desired value comparison at each individual joint occurs through the associated coordinate indicator. Because of deformations of the airplane and of the substructure, inexactnesses of the process, and dynamic errors of the device, a fine tuning must be carried out. In order to achieve the demanded washing result, the manipulator 6 must be moved with an exactness of approximately 10 mm with respect to the prescribed penetrating depth of the washing brush into the surface. This can only be achieved with an additional sensory mechanism, which compensates for the mentioned errors by measuring the bearing pressure and by supplying the auxiliary axes of the multiple joint 16. The auxiliary axes are pivot axes, which compensates for the orientation errors of the brush head 18.

It is basically possible to permit the distance camera 40 to also run during the course of a washing program and to utilize same for monitoring collisions. The distance camera 40 can hereby measure individual joints and the airplane 44 and control these preventing collisions. This could be important if, for example, a measured-value receiver at one of the joints breaks down and delivers incorrect measured values, which are not recognized by the operator and by the calculator.

As an alternative or in addition to this, it can be provided that position, dimension tolerances, and deformation tolerances of the aircraft 44 and/or tolerances of the large manipulator 6 are compensated for. An example of such tolerances, is the dimensional deviations of airplane 44. These deviations from the standard dimensions occur in airplanes of the same model or of the same type of construction, which results in the need for operating-sequence control. Deviations can also slightly differ from airline to airline, for example in the arrangement of antennas, sensory mechanisms, engines, fairings and landing flaps, etc., and the deformation tolerances, which are caused by different loading conditions of the aircraft 44 and by environmental influences, for example the temperature. These grid-point-specific programs are adjusted on-line to these types of conditions.

In conclusion the following is to be stated: The invention relates to a process and an arrangement for the surface cleaning of airplanes 44, in which a large manipulator, which is arranged on an undercarriage 8, is moved into a specified-position within the reach of the airplane 44 and is there parked, and in which a rotating brush head 18 is moved over the surface of the object by means of an articulated mast 13, which is arranged on the undercarriage 8 and consists of several arms 12, 12', 12", 12'", 14, which are pivotal or movable with respect to one another on pivot and/or thrust joints, and a multiple joint 16 arranged on the last arm 14. In order to guarantee even during an inexact positioning of the large manipulator 6 in front of the airplane 44 a reliable and collision-free washing operation, the large manipulator 6 is stationed within a limited two-dimensional parking field 46 spaced from the airplane 44, whereas the joints 20 to 28 of the articulated mast 13 and/or of the multiple joint 16 are controlled during the surface treatment in accordance with a series of joint-coordinate sets associated with the actual position of the large manipulator 6 within the parking field 46, and the brush head 18 is thereby moved along a predetermined operating path over the surface of the object.

We claim:

1. A process for the treatment of a large object by means of a treating device having at least one treating unit, comprising the steps of moving the treating device into a parking field at a predetermined reference point and positioning the treating device at a distance from the object, whereby the predefined reference point of the parking field is at a fixed position with reference to at least one reference point of the object, guiding the spacial movements of the at least one treatment unit with respect to the predefined point, defining grid fields by a specific number of grid points in the parking field, determining an operating-sequence control for each grid point for controlling the at least one treating unit of the treating device, contacting the treating unit actively against the object to be treated, controlling the spacial movement of the at least one treating unit by the operating-sequence control of one of grid points, guiding the at least one treatment unit with respect to the one grid point of the parking field, determining the one actual position of the treating device with reference to the parking field, determining the one grid point with the least distance from the actual position of the treating device from the number of grid points associated with the parking field, and selecting one of the operating-sequence control associated with the one grid point and an interpolation of an operating-sequence control for the actual position calculated and stored in a storage of the manipulator control as an actual washing program.

2. The process according to claim 1, further comprising the step of creating the operating-sequence control associated with the reference point and the operating-sequence controls associated with each of the grid points off-line.

3. The process according to claim 1, further comprising the step of determining a characteristic parameter of the operating-sequence controls associated with the predefined reference point and the grid points by the spacial position difference between the fixed reference point of the object and the fixed grid points.

4. The process according to claim 1, further comprising the step of arranging the grid points equi-distant to each other in an equi-distant grid.

5. The process according to claim 1, further comprising the step of selecting a shape of the parking field as one of a circle with the radius R and a regular polygon around the predefined reference point.

6. The process according to claim 1, selecting one of the following as a further characteristic parameter of the at least one operating-sequence control associated with the one grid point of the parking field:

a) the relative position between the grid point, which lies the closest to the actual position of the treating device, and the actual position of the treating device;

b) deviations of the object from standard dimensions used as the basis for determining the operating-sequence control; and c) the measuring signals of a monitoring device of the at least one treating unit.

7. The process according to claim 1, further comprising the steps of depending a base part of the at least one operating-sequence control only on the position of the one grid point associated with the operating-sequence control and depending a correction/adaption part on the distance of the actual position of the treating device from the one grid point and additional adaption parameters.

8. The process according to claim 1, further comprising the steps of carrying out the movements of the at least one treating unit of the treating device, which movements are controlled by only the grid-point-dependent part of the operating-sequence control, essentially while determining the on-line corrections of the operating-sequence control, which on-line corrections are needed for the adaption of the operating-sequence control.

9. The process according to claim 1, further comprising the steps of controlling several arms of the treating device which are pivotal or movable on at least one of pivot joints and thrust joints, controlling an articulated mast of the treating device arranged on an undercarriage, and both controlling steps occurring during the course of the treatment in accordance with a sequence of specified joint-coordinate sets by an operating-sequence control, which sequence is associated with the actual position of the treating device within the parking field.

10. The process according to claim 1, further comprising the step of moving the treating unit along a specified treatment path over the surface of the object.

11. The process according to claim 1, further comprising the step of measuring and outputting at least one of the frictional resistance, torsional resistance, and the contact pressure read at the treating unit as a sensor signal.

12. The process according to claim 1, further comprising the steps of measuring the distance of the treating unit from the object without contact and outputting the measured distance as a sensor signal.

13. The process according to claim 1, further comprising the step of measuring and outputting the inclination of the treating device relative to one of a substructure and the object to be treated as a sensor signal.

14. The process according to claim 1, further comprising the steps of taking a distance image of a specified section of the object to be treated with an opto-electronic distance camera, and comparing the distance image with a reference image of the specified section.

15. The process according to claim 14, further comprising the steps of converting deviations resulting from the comparing step into at least one of steering and driving signals when outside of the parking field and positioned-determining locating signals when within the parking field.

16. The process according to claim 1, further comprising the steps of calculating through interpolation the position-referenced operating-sequence control from the operating-sequence control stored in a data bank in accordance with the actual position of the treating device within the grid field and storing the position-referenced operating-sequence control in a stored data file prior to the treatment using operating-sequence control read from the stored data file.

17. The process according to claim 16, further comprising the step of correlating the operating-sequence control read from the stored data file with sensor signals extracted at every support point of the treatment device.

18. The process according to claim 17, further comprising the step of monitoring the operating-sequence control with respect to freedom from collision through a comparison with operating-sequence control stored with respect to adjacent grid points taking into consideration specified tolerance limits.

19. An arrangement for the treatment of objects, comprising a treating device having at least one treating unit, the treating device being positionable in a specified parking field adjacent an object to be treated, an opto-electronic distance camera arranged on the treating device and alignable with respect to the object to be treated for producing distance-image signals, and evaluating electronics receiving the distance-image signals of the distance camera, the evaluating electronics having storage means for storing distance-image data of the object from the view of several grid points of the specified parking field, first software means for comparing the distance-image data taken by the distance camera when the treating device is positioned in front of the object with the stored distance-image data, and second software means for determining the coordinate position of the treating device within the specified parking field and for associating the coordinate position of the treating device with a closest one of the several grid points.

20. The arrangement according to claim 19, wherein the parking field is of a virtual nature and is stored in the evaluating electronics.

21. The arrangement according to claim 19, wherein an undercarriage supports the treating device and has a pivot-bearing block, the treating device has an articulated mast, said articulated mast including several arms pivotal with respect to one another on pivot joints by means of a driving system, the articulated mast being rotatably supported by a base arm of the several arms about a vertical axis on the pivot-bearing block and having the treating unit, arranged on one of a last arm of the several arms and a free end of a multiply pivotable joint arranged on the last arm, the multiply pivotable joint having several joints thereon, the several joints being at least one of extension joints and pivot joints.

22. The arrangement according to claim 21, wherein at least one of the treating device and the articulated mast has at least one redundant degree of freedom.

23. The arrangement according to claim 21, wherein the articulated mast has coordinate measurement devices for outputting a value corresponding with the respective joint coordinate which can be electrically read, the coordinate measurement devices each correspond to one of the pivot joints.

24. The arrangement according to claim 23, wherein the evaluating electronics has a calculator circuit for normalizing the joint coordinates in accordance with the treatment device coordinates measured directly by the coordinate measurement devices and through the distance camera relative to a stationary, cubic calibration volume.

25. The arrangement according to claim 21, wherein the distance camera is movably arranged near the pivot-bearing block, the distance camera being pivotal about a vertical axis and inclinable about a horizontal axis on the treating device.

26. The arrangement according to claim 25, wherein the parking field is divided by a two-dimensional grid field having a plurality of the grid points, each grid point within the grid field being associated with one of an operating-sequence control, a joint-coordinate data file and a moving program within a data bank of the storage means, the data bank storing one of a series of individual movements and joint-coordinate sets of the articulated mast along an operating path to be travelled by the treating unit on the surface of the object.

27. The arrangement according to claim 26, wherein the evaluating electronics has a calculator circuit for controlling the driving system of the pivot joints in accordance with the deviation of one of the operating-sequence controls and the joint coordinates read at the coordinate measurement devices from the associated values of one of the stored operating-sequence controls and the joint-coordinate sets.

28. The arrangement according to claim 26, wherein the treating unit has a sensor for measuring a safe operating distance from the surface of the object to be treated, the sensor measuring one of operating resistance and depth of penetration of the treating unit into the surface to be treated, and the sensor outputting a signal, and correcting signals being derived from the signal of the sensor to have the driving systems of the articulated-mast joints follow to prevent damage to the object to be treated.

29. The arrangement according to claim 26, wherein at least one inclination indicator reacting to deformations in the substructure of the treating device is associated with at least one of the pivot and inclination axes of the distance camera, and correcting signals are derived from output signals of the inclination indicator to control the driving system of the articulated-mast joints.

30. An arrangement for the treatment of objects, comprising: a treating device having at least one treating unit and an articulated mast supporting the treating unit, the treating device being positionable in a parking field adjacent an object to be treated, the parking field being a two-dimensional gridded field having a plurality of grid points, each grid point being associated with one of operating-sequence controls, one of joint-coordinate data files and one of moving programs; an opto-electronic distance camera arranged on the treating device and alienable with respect to the object to be treated for producing distance-image signals; and evaluating electronics receiving the distance image signals of the distance camera, the evaluating electronics having a storage arrangement for storing distance image data of the object from the view of several grid points in the parking field, the storage arrangement storing the operating sequence controls, the joint-coordinate data files and the moving programs, the storage arrangement having a data bank storing one of a series of individual movements and joint coordinate sets of the articulated mast along an operating path to be travelled by the treating unit on the surface of the object, first software means for comparing the distance-image signals taken by the distance camera with the treating device being positioned in front of the object with the stored distance image data, second software means for determining the coordinate position of the treating device within the parking field and for association of the coordinate position with a closest one of the several grid points, and a third software means for calculating and storing one of a series of operating-sequence controls and joint-coordinate sets designated for the treatment operation through interpolation from one of the stored operating-sequence controls and joint-coordinate sets in accordance with the deviation of the actual position of the treating device from adjacent ones of the grid points within the specified grid field.

* * * * *

UNITED STATES PATENT AND TRADEMARK OFFICE
CERTIFICATE OF CORRECTION

PATENT NO. : 5 833 762
DATED : November 10, 1998
INVENTOR(S) : Martin-Christoph WANNER, et al.

It is certified that error appears in the above-identified patent and that said Letters Patent is hereby corrected as shown below:

On the title page, item [73], Assignee should read:

---Putzmeister-Werk Maschinenfabrik GmbH---.

Signed and Sealed this

Twentieth Day of February, 2001

*Attest:*

NICHOLAS P. GODICI

*Attesting Officer*   *Acting Director of the United States Patent and Trademark Office*